T. P. ROSSI.
TRICYCLE.
APPLICATION FILED NOV. 22, 1915.

1,250,665.

Patented Dec. 18, 1917.

Witnesses
Arthur K. Moore
W. A. Budd

Inventor
T. P. Rossi
By Charles Chandler
Attorneys

UNITED STATES PATENT OFFICE.

TONY P. ROSSI, OF ALBUQUERQUE, NEW MEXICO.

TRICYCLE.

1,250,665. Specification of Letters Patent. Patented Dec. 18, 1917.

Application filed November 22, 1915. Serial No. 62,799.

*To all whom it may concern:*

Be it known that I, TONY P. ROSSI, a citizen of the United States, residing at Albuquerque, in the county of Bernalillo, State of New Mexico, have invented certain new and useful Improvements in Tricycles; and I do hereby declare the following to be a full, clear, and exact description of the invention, such as will enable others skilled in the art to which it appertains to make and use the same.

This invention relates to tricycles and the object thereof, is to provide a supplemental seat having a series of downwardly extending supporting arms, adapted to be detachably connected to the frame of the tricycle, means being provided for supporting the feet of the occupant of the supplemental seat, at the rear of the operator.

A further object resides in the provision of means for rigidly and detachably connecting the supplemental seat frame to the tricycle frame.

Referring to the drawings, forming a part of the application:

Figure 1:
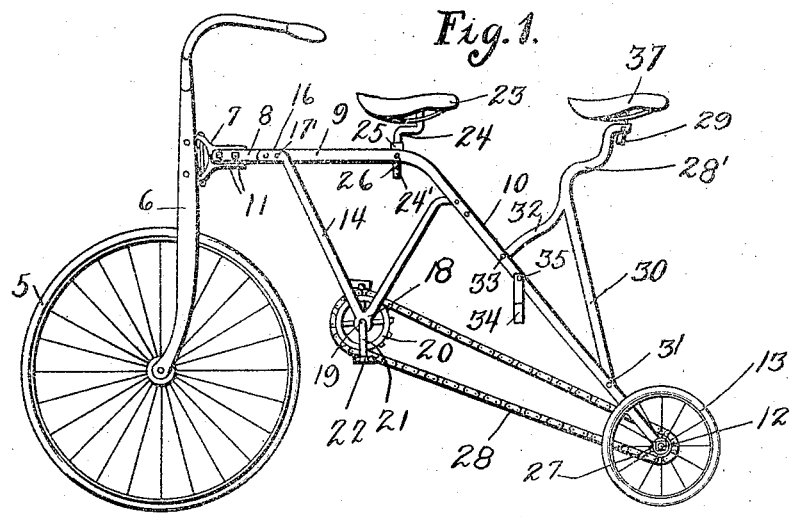
Figure 1, is a side elevational view of my improved tricycle.
Figure 2:
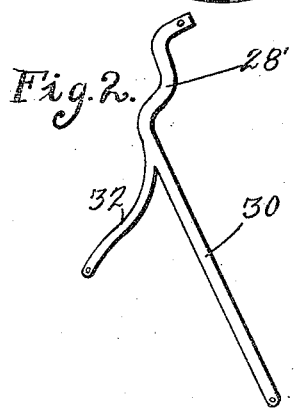
Fig. 2, is a detail view of the supplemental seat supporting frame.
Figure 3:
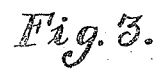
Fig. 3 is a detail view of the intermediate sprocket supporting frame member.
Figure 4:
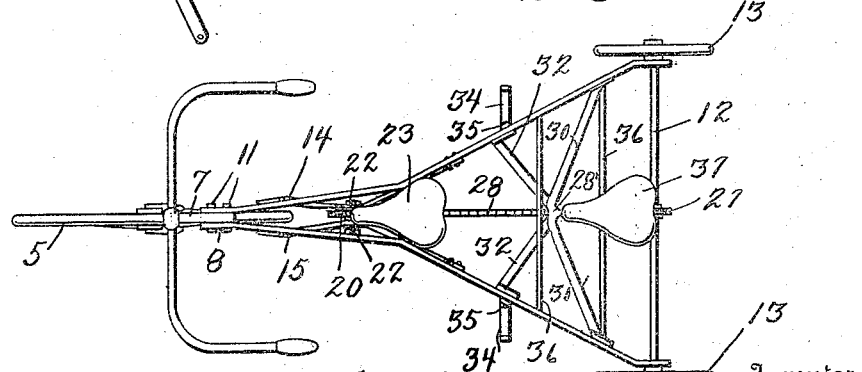
Fig. 4 is a plan view of the tricycle.

Referring to the figures of the drawing, the numeral 5 designates the front wheel, which is journaled in the front fork 6, which latter has a fork head 7 pivotally mounted thereon. The rear fork, comprising the rods 8, extends in a horizontal plane at 9, and is then bent in an oblique plane at 10, and the outer ends of the horizontal portions of the said rods 8, are secured to the fork head 7, by means of bolts or rivets 11. The rear fork rods 8 gradually diverge outwardly and extend rearwardly to form bearings for the shaft 12, carrying the two rear supporting wheels 13, which latter are mounted in the lower ends of the oblique rods 10 of the fork.

An intermediate frame is carried by the rear fork and comprises two parallel V-shaped, downwardly extending rods 14 and 15, which like said forks are constructed of the usual metal tubing, and the upper ends of said rods 14 and 15 are bent outwardly at an angle and flattened as at 16. The flattened portions 16 are apertured at 17 for the reception of bolts or rivets 17', for securing same to the horizontal portion 9 of the fork rods 8, and to the oblique portions 10 of the said fork rods.

The V-shaped rods 14 and 15, at their apex portions, are enlarged at 18, and said enlargements are apertured at 18', and form journals for the operating shaft 19, which is disposed in the said apertures 18'. A sprocket 20 of the usual construction is keyed on the shaft 19 and disposed centrally thereof, and between the said rods 14 and 15, comprising the frame, and the usual operating cranks 21 and pedals 22 are secured to the shaft 19, by which the tricycle is operated.

A seat 23, comprising the ordinary saddle construction, is arranged on a seat post 24, which is of the usual construction, having a threaded shank 24', which is adjustably mounted in the apertured plate 25, the latter spanning the rear fork rods, and being secured to same by bolts or rivets 26. A small rear sprocket 27 is keyed on the rear shaft 12 and revolves therewith, and a chain 28 passes over the sprockets 20 and 27, serving to propel the tricycle when the pedals are actuated.

Detachably mounted on the rear fork is a tubular supplemental seat frame 28', comprising a seat post rod 29, and the metal tubing comprising the frame intermediate its length, is longitudinally split to form the two outwardly diverging supporting rods 30, the lower ends of which are secured by bolts or rivets 31, to the lower part of the obliquely extending frame rods 10, and the forward or front supporting rods 32, which diverge outwardly and have their ends secured by bolts or rivets 33, to the upper part of the obliquely extending rods 10 of the rear fork.

Foot supports 34 are secured to the rods of the rear fork by bolts or rivets 35, and are constructed of spring metal, and project outwardly from the fork rods to receive the feet of the occupant of the rear seat.

It is obvious that by the above construction, a unitary structure is provided and the same is possessed of fewness of parts and simplicity of structure and operation.

The operator of the tricycle, positioned on the front seat, actuates the pedals, thereby driving the front sprocket, and by means of the chain the rear sprocket, which is keyed to the rear shaft 12, is actuated, serving to impart motion to the rear wheels.

From the foregoing description, taken in connection with the accompanying drawings, the advantages of the construction and the method of operation will be readily apparent to those skilled in the art to which the invention appertains, and while I have described the principle of operation of the invention, together with the device which I now consider the embodiment thereof, I desire to have it understood that the device is merely illustrative, and that such changes may be made when desired as are within the scope of the claim appended hereto.

As will be seen, the supplemental seat frame 28', may be detached from the rear fork by removing the bolts 31 and 33, and the tricycle used in the ordinary manner, in which case the machine may be mounted by means of the step rod 36, secured adjacent the lower ends of the rods 10 of the rear fork and spanning same.

Likewise the supplemental seat 37, may be adjusted on the seat frame 28', in the ordinary manner.

What I claim and desire to secure by Letters Patent, is:

A tricycle, comprising in combination, a front fork, a rear fork having its front end pivotally mounted upon the front fork and extending first rearwardly and then downwardly in divergent arms which begin at the pivotal mounting, a comparatively large wheel supporting the front fork, and comparatively small wheels supporting the rear end of the rear fork, a pair of V-shaped frames suspended side by side from the arms of the rear fork across the angular downward bend of its path and being brought together below the latter to provide a sprocket bearing, a sprocket mounted in said bearing, a second pair of V-shaped frames rising from the downwardly directed portions of the members of the fork and meeting thereabove to provide a seat support, said sprocket and seat supports serving to brace the members of the rear fork, seats carried by the rear fork and upon said seat support and a driving connection between the sprocket and the rear wheels.

In testimony whereof, I affix my signature, in the presence of two witnesses.

TONY P. ROSSI.

Witnesses:
J. H. SMITH,
J. G. ALBRIGHT.

Copies of this patent may be obtained for five cents each, by addressing the "Commissioner of Patents, Washington, D. C."